July 9, 1968      T. P. CARHARTT      3,391,884

SHOCK WAVE DEFLECTOR

Filed Nov. 12, 1965

INVENTOR.
THOMAS P. CARHARTT
BY

United States Patent Office 3,391,884
Patented July 9, 1968

3,391,884
SHOCK WAVE DEFLECTOR
Thomas P. Carhartt, 171 Sheldon Drive,
Centerville, Ohio 45459
Filed Nov. 12, 1965, Ser. No. 507,295
3 Claims. (Cl. 244—34)

ABSTRACT OF THE DISCLOSURE

The present invention relates to shock wave deflector means for sonic and supersonic aircraft and is characterized primarily by relatively long and narrow deflector strip means of approximately wing profile located in the vicinity of and in the flight direction of the aircraft behind the leading edge of the wing at a lower level than the latter. The invention is characterized primarily in that the leading edge of said deflector strip means is substantially parallel to and substantially uniformly spaced from the respective adjacent leading edge of said aircraft wing, said deflector strip means having its top surface so located with regard to the bottom surface of said aircraft wing that shock waves propagated at said wing leading edge at a first angle with regard to the bottom surface of said wing and after being deflected by said last-mentioned surface against the bottom of said wing are deflected by said bottom in the direction toward the ground at a second angle with regard to said bottom surface of said wing, said second angle being less than said first angle.

---

The present invention relates to a method and apparatus for deflecting shock waves, particularly those shock waves developed at the leading edges of an aircraft in supersonic flight.

As is known, an aircraft moving through the air at supersonic speeds has a flow field enveloping the aircraft which contains numerous shock wave systems. These shock wave systems propagate away from the aircraft and tend to coalesce into front and rear shock waves. The front and rear shock waves or the bow and tail shock waves, may be properly visualized as conical in cross section with their apexes attached to the aircraft and located on the aircraft at the forwardmost and rearwardmost points thereof. The shock waves travel with the aircraft as long as the aircraft is moving at supersonic speeds and the shock wave cones create a hyperbolic type intersection with the ground.

As is also known, as the waves pass a given point on the ground, the point will be subjected first to a very rapid increase in pressure as the bow shock wave passes the point, followed by a gradual decrease in pressure, and finally the point is subjected to a second rapid increase in pressure as the tail shock wave passes followed by a decrease in pressure to normal. The ear will perceive these rapid pressure changes as sounds similar to what is created by an explosion and the sounds are commonly referred to as "sonic booms." The waves sometimes contain sufficient energy that damage to structures may occur such as by way of window breakage, of plaster cracking and falling and the like.

The matter of the sonic booms created by aircraft in supersonic flight has been one of the major problems in connection with both military and commercial flight programs.

The present invention is particularly concerned with a method and apparatus for minimizing the effect of such sonic booms at ground level.

A particular object of the present invention is the provision of a method and apparatus for deflecting shock waves developed by aircraft in supersonic flight for the purpose of substantially reducing or entirely eliminating the sonic boom effect created thereby at ground level.

Still another object of this invention is the provision of a relatively simple arrangement for disrupting the shock wave pattern of supersonic aircraft, at least on the lower side thereof, and which arrangement is simple to apply to an aircraft and relatively inexpensive.

Another object of this invention is the provision of an apparatus that can be mounted on a substantially conventional aircraft and which is operable for eliminating or at least diminishing at least the downward shock wave from the aircraft when it is in supersonic flight thereby either eliminating or at least diminishing the sonic booms at ground level resulting therefrom.

A still further object is the provision of an apparatus of the nature referred to which is efficient, durable, and reliable and which will meet all safety requirements even the most rigid sort.

The several objects and advantages referred to above as well as still other objects and advantages of the present invention will become more apparent upon reference to the following detailed specification taken in connection with the accompanying drawings in which.

Figure 1:
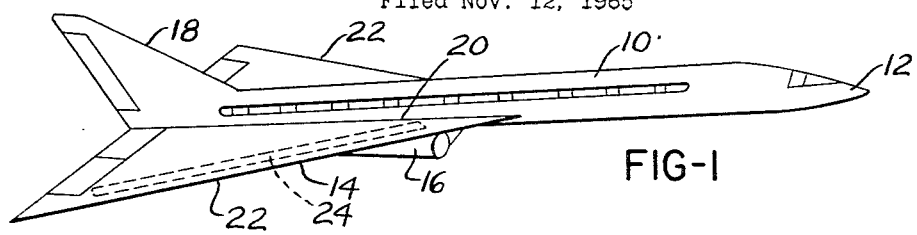
FIGURE 1 is a perspective view of a typical aircraft capable of supersonic flight showing one location thereon for a device or arrangement according to the present invention.

Referring to the drawings somewhat more in detail, the plane shown in FIGURE 1 is capable of supersonic flight and comprises a fuselage portion 10 having a nose section 12 and having a wing 14. The aircraft also comprises engine nacelles 16 and a tail 18. The wing 14 joins the fuselage along a juncture line 20.

The shock waves developed by the aircraft in supersonic flight can arise at any frontal area, protuberance, or any other portion of the external configuration of the aircraft which can cause a pressure field build-up. Main sources of the shock wave, and in fact, the main sources which create disturbing sonic booms at ground level are the leading edges of the wing 14 and the tail 18. The present invention is illustrated in this application as being concerned with the leading edges 22 of the wing 14, but it will be understood that the invention is broadly applicable to any region of the exterior surface of the aircraft where shock waves are developed.

In brief, the present invention is concerned with the provision of shock wave deflector plates or vanes so located on the aircraft as to eliminate or diminish or deflect or otherwise disturb the pattern of the shock wave developed by the aircraft, and, in particular, the downwardly propagated shock wave.

Figure 2:
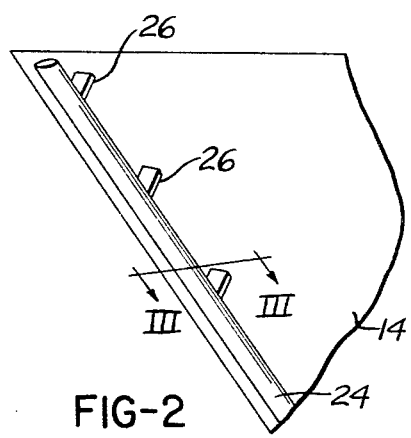
FIGURE 2 is a fragmentary elevational view looking up from beneath the leading edge of a wing of the aircraft of FIGURE 1 showing a device according to the present invention mounted thereon.
Figure 3:
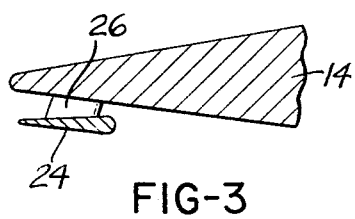
FIGURE 3 is a fragmentary sectional view indicated by line III—III on FIGURE 2 showing more in detail the shock wave inhibiting device according to the present invention.

As will be seen in FIGURES 2 and 3, and as is illustrated in dotted lines in FIGURE 1, there is provided immediately beneath the leading edge 22 of wing 14, deflector plate 24 which is suspended from the said leading edge of wing 14 by a suitable number of supporting brackets 26. As will be seen in FIGURE 3 the deflector plate is a relatively thin member having relatively sharp leading and trailing edges, similar to the configuration in cross section of wing 14.

The deflector plate or vane may be a solid member or may be apertured or constructed of corrugated or honeycomb composite or may be grill-like or mesh-like in nature. Further, the upper surface of the deflector plate may be transversely corrugated. Any of the aforementioned interruptions of the surface of the deflector blade will tend to diffuse the shock wave and thereby reduce the intensity of the effect thereof at ground level. The deflector plate or vane is subjected to considerable force and it will be understood that support brackets 26 are sufficiently rigid or are otherwise so constructed and positioned as substantially to eliminate flutter of the plates or vane supported thereby.

Figure 7:
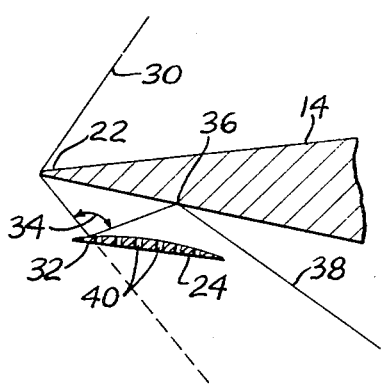
FIGURE 7 is a schematic view illustrating, in general, the theory underlining the present invention.

Reference to FIGURE 7 will illustrate somewhat schematically the manner in which the deflector plate or vane according to the present invention operates. FIGURE 7 is a view showing how shock wave 30 is set up at the leading edge 22 of wing 14. The lower portion of the shock wave is that one which creates the sonic boom at ground level.

According to the present invention, deflector plate 24 is so positioned beneath the leading edge of wing 14 that the lower side of shock wave 30 is intersected by the blade or vane as at 32 and is reflected therefrom with included angle at 34 which is not less than 90° and is preferably greater than 90°. The deflected shock wave may again reflect from the wing at point 36 and is then propagated away from the aircraft, as along line 38. The line 38, it will be appreciated, extends rearwardly at a substantially greater angle than the original front of the shock wave, so that, depending upon the altitude of the aircraft, the rearward deflection of the front of the shock wave might be sufficient to prevent any effective shock wave from reaching ground level. In any case, increasing the said included angle in the manner referred to will at least diminish the shock wave intensity at ground level by substantially increasing the length of travel of the shock wave from the aircraft to the ground, particularly, when the wave is also diffused by the aforementioned surface interruptions of the deflector plate. It is apparent that, as the distance the shock wave travels to the ground increases, the intensity of the shock wave at a ground level will decrease.

Still further, the shock wave is deflected by the plate or vane in such a manner that it is effectively prevented from coalescing with other shock waves being propagated from the aircraft thereby further diminishing the overall intensity of the shock wave at ground level and thereby at least reducing the severity of any resulting sonic boom.

FIGURE 7 will also illustrate the holes 40 which may be provided in the deflector blade or vane and which serve, as mentioned before, as surface interruptions, further to interfere with the shock wave pattern by diffusion thereof. As mentioned, the apertures 40 could be provided by forming the blade or vane of honeycomb structure or of mesh or grill or the like. Still further the surfaces of the blade or vane could be transversely corrugated thereby interfering with or disrupting the pattern of the shock wave whereby further to decrease the intensity thereof at least at ground level.

Figure 4:
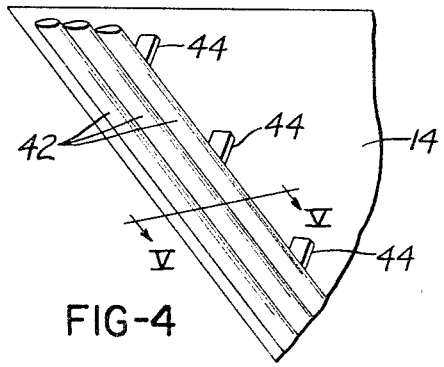
FIGURE 4 is a view like FIGURE 2 which shows a modified arrangement of a shock wave inhibiting device.
Figure 5:
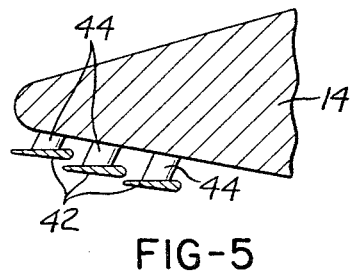
FIGURE 5 is a sectional view similar to FIGURE 3 but taken on line V—V on FIGURE 4.

As will be seen in FIGURES 4 and 5, instead of a single deflector plate or vane 24 as illustrated in FIGURES 2 and 3, a plurality of deflector plates or vanes 42 could be provided suspended on suitable bracket means 44 preferably arranged in staggered somewhat overlapping relation as indicated in FIGURE 5. The arrangement in FIGURE 5 not only provides for superior disruption of the shock wave front, but also makes the arrangement adaptable for a wide range of speeds of flight of the aircraft.

Figure 6:
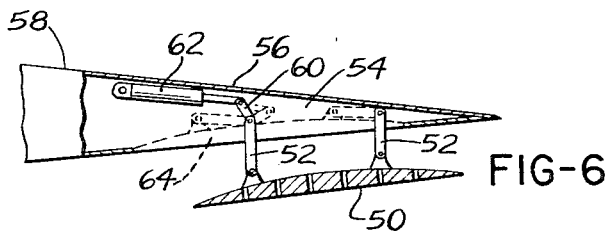
FIGURE 6 is a sectional view of an aircraft wing showing a shock wave deflecting device according to the present invention which is retractable into the wing.

While the deflector blades or vanes according to the present invention offer little resistance to the flight of the aircraft, it may still be preferable to provide means for making the deflectors substantially ineffective at times. With this in mind the construction of FIGURE 6 is proposed where the deflector plate or vane 50 is mounted on arms 52 pivoted at their one end to the deflector plate or vane and at their other end within a cavity 54 provided in replaceable nose member 56 of the wing 58. One of the levers 52 has arm portion 60 projecting beyond its point of pivotal connection with the nose member 56 and mounted within the nose member 56 is a fluid motor 62 which can be energized either to move the deflector plate or vane to its extended effective position, as shown in full lines, or to its retracted ineffective position within the confines of the nose member 56, as shown in dotted outline at 64. By the provision of the arrangement of FIGURE 6 the deflector plate or vane can be retracted within the confines of the wing when the aircraft is flying at less than supersonic speed, or when it is flying over a sparsely populated area or at extreme height whereby the aircraft will perform at maximum efficiency or, when it is desired to influence the sonic boom caused by the shock wave at ground level, the deflector blade or vane can be moved to its extended position. When the plate is retracted, the bottom surface of the plate forms a continuation of the wing surface.

In configuration it will be appreciated that the deflector blades or vanes could be substantially flat on the bottom as shown in FIGURES 6 and 7 and are preferably somewhat curved on top whereby to control the angle of reflection of the shock wave therefrom so that the included angle between the shock wave front intercepted by the plate or vane and the front of reflected wave is at least 90°, preferably, greater than 90°. It will further be understood that the location of the deflector plate or vane is critical and is dependant upon skin curvature, upon the generated flow field, and upon the position of the shock wave formed for that particular portion of the aircraft. Thus the particular location of the deflector plates or vanes at various positions about the aircraft will vary somewhat, and it will be understood that the particular positions illustrated in the drawings are exemplary only of the exact positioning of the plates or vanes on the aircraft.

While it is the case that the leading edge of the wing portions of the aircraft are those that contribute principally to the creation of the sonic booms at ground level, it might, for various reasons, be desirable to interrupt the shock wave pattern emanating in any direction or a particular portion of the aircraft and it is within the purview of the present invention to provide such deflector plates or vanes at any desired point on the aircraft either on top or the bottom or the side thereof adjacent any region of origination of a shock wave.

It will be understood that this invention is susceptible to modification in order to adapt it to different usages and conditions; and accordingly, it is desired to comprehend such modifications within this invention as may fall within the scope of the appended claims.

What is claimed is:

1. In an aircraft adapted to fly at sonic and supersonic speeds, which has a wing with a leading edge at which shock waves develop and from which the shock waves are propagated in a direction away from the aircraft: relatively long and narrow deflector strip means of approximately wing profile located in the vicinity of and in the flight direction of the aircraft behind said leading edge at a lower level than the latter, the leading edge of said deflector strip means being substantially parallel to and substantially uniformly spaced from the respective adjacent leading edge of said aircraft wing, said deflector strip means having its top surface so located with regard to the bottom surface of said aircraft wing that shock waves propagated at said wing leading edge at a first angle with regard to the bottom surface of said wing and after being deflected by said top surface against the bottom of said wing are deflected by said bottom in the direction toward the ground at a second angle with regard to said bottom surface of said wing, said second angle being less than said first angle, said deflector strip being further provided with passage means extending all the way therethrough for passing therethrough a portion of the shock waves impacting upon said deflector strip means.

2. An aircraft according to claim 1, in which said deflector strip means comprises a plurality of selectively long and narrow deflector strips staggered in vertical direction with regard to each other.

3. An aircraft according to claim 3, in which when looking toward the tail end of the aircraft the leading edges of the second and succeeding deflector strips are slightly overlapped by the respective trailing edge of the respective preceding deflector strip.

References Cited

UNITED STATES PATENTS

| | | | |
|---|---|---|---|
| 3,128,973 | 4/1964 | Dannenberg | 244—130 |
| 3,170,657 | 2/1965 | Riebe et al. | 244—46 |

FOREIGN PATENTS

| | | |
|---|---|---|
| 730,121 | 5/1955 | Great Britain. |
| 786,778 | 11/1957 | Great Britain. |
| 1,036,691 | 9/1953 | France. |

OTHER REFERENCES

Mockel, W. E., Theoretical Aerodynamic Coefficients of Two-Dimensional Supersonic Biplanes. NACA TN 1316. June 1947, pp. 12–13 and FIGURE 12.

FERGUS S. MIDDLETON, *Primary Examiner.*

MILTON BUCHLER, *Examiner.*

T. MAJOR, *Assistant Examiner.*